(12) United States Patent
Osterholt et al.

(10) Patent No.: US 7,234,672 B1
(45) Date of Patent: Jun. 26, 2007

(54) RETRACTABLE HANGER

(76) Inventors: Lana M. Osterholt, 261 Sycamore Grove St., Simi Valley, CA (US) 93065; Gerald R. Osterholt, 261 Sycamore Grove St., Simi Valley, CA (US) 93065

( * ) Notice: Subject to any disclaimer, the term of this patent is extended or adjusted under 35 U.S.C. 154(b) by 205 days.

(21) Appl. No.: 11/067,332

(22) Filed: Feb. 25, 2005

(51) Int. Cl.
*F16B 45/00* (2006.01)
*A63F 9/00* (2006.01)

(52) U.S. Cl. .................. 248/304; 248/290.1; 248/692; 273/148 R; 463/47

(58) Field of Classification Search ............. 248/304, 248/686, 690, 691, 692, 289.11, 290.1, 914; 223/130; 273/148 R; 463/47
See application file for complete search history.

(56) References Cited

U.S. PATENT DOCUMENTS

| | | | | |
|---|---|---|---|---|
| 965,660 A | * | 7/1910 | Samson | 248/290.1 |
| 1,260,168 A | * | 3/1918 | Engle | 248/290.1 |
| 2,390,257 A | * | 12/1945 | Jahn | 248/294.1 |
| 3,357,670 A | * | 12/1967 | Larson | 410/106 |
| 3,861,633 A | * | 1/1975 | Rappleye et al. | 248/290.1 |
| 4,720,028 A | * | 1/1988 | Takemura et al. | 224/553 |
| 4,846,333 A | | 7/1989 | Kissick | |
| 4,978,093 A | | 12/1990 | Kennedy | |
| 6,095,469 A | * | 8/2000 | Von Alman | 248/304 |
| 6,109,579 A | * | 8/2000 | Huang | 248/294.1 |
| 6,536,731 B1 | * | 3/2003 | Tegland | 248/309.2 |
| 6,663,067 B2 | * | 12/2003 | Gordon | 248/294.1 |
| 6,779,794 B2 | | 8/2004 | Hedrick et al. | |

* cited by examiner

*Primary Examiner*—Anita M. King
(74) *Attorney, Agent, or Firm*—Jack C. Munro; Sandy Lipkin

(57) ABSTRACT

A retractable hanger comprising a base member which has recessed mounted therein a hook. The base member is adapted to be securely mounted on the exterior structure with the base member being recessed within the exterior structure. The hook is capable of pivotable movement between a retracted position and an extended position. When in the extended position, the hook is capable of having articles hung thereon. A spring connects to the hook that exerts a bias on the hook to move the hook from the extended position to the retracted position.

9 Claims, 3 Drawing Sheets

RETRACTABLE HANGER

BACKGROUND OF THE INVENTION

1. Field of the Invention

This invention relates to a retractable hanger which is designed to be mounted in conjunction with an exterior structure. One example of such an exterior structure is a coin tray of a slot machine.

2. Description of the Related Art

When people are sitting at a table, it is a problem how a person can store a personal item such as a handbag. Placing of the handbag within one's lap is not convenient. Within certain environments, such as gambling environments, laying of the handbag on the gambling table is not permitted. Placing of the handbag under the person's chair or under the chair increases the risk of having the handbag stolen by a purse snatcher.

Gaming establishment owners want their players to feel as comfortable and secure as possible relative to their personal belongings when playing of slot machines or when playing other types of games, such as blackjack. If the person playing the game is able to see his or her handbag out of the corner of his or her eye when facing the gaming table or the slot machine, then the user can feel reasonably secure that the handbag will not be stolen.

Gaming establishments desire to place as many slot machines within a given area as possible. This means that the slot machines are closely grouped together with there being a minimal amount of space between one slot machine and the next adjacent slot machine. In conjunction with a slot machine, there is only a minimal amount of structure that is available to be used in conjunction with some type of a hanger that would permit the temporary storage of a handbag. The present inventor has found that the only convenient location for such a hanger is in conjunction with the coin tray of the slot machine. Such a hanger has to be retractable so that the hanger will be stowed in an out of the way position when not in use which will prevent another person from catching his or her clothes or body on the hook of the hanger when it is not being used. Such hanging devices have to be attractive besides being functional as attractiveness of a gaming device within a gaming establishment is desirable in order to encourage people to play within their gaming establishment.

SUMMARY OF THE INVENTION

The first basic embodiment of the present invention is directed to a retractable hanger which utilizes a base member to be securely mounted on an exterior structure with the base member being recessed. The base member includes a recessed chamber. A hook, which has an inner leg and an outer leg connected together by a connecting leg, is to be pivotally mounted on the base. The hook is movable between a retracted position and an extended position with the retracted position located within the recessed chamber. The extended position locates the hook protruding from the base member.

A further embodiment of the present invention is where the first basic embodiment is modified by defining that the outer leg is located parallel to the inner leg of the hook.

A further embodiment of the present invention is where the first basic embodiment is modified by including of a finger recess on the connecting leg of the hook to facilitate manual movement of the hook from the retracted position to the extended position.

A further embodiment of the present invention is where the inner leg of the hook includes a right angle extension which is to connect with a spring which exerts a continuous bias tending to locate the hook in the retracted position.

A further embodiment of the present invention is where the first basic embodiment is modified by including of a detent in conjunction with the base member where the hook is to connect with this detent when in the extended position with the detent functioning to keep the hook in that extended position.

A further embodiment of the present invention is where the just previous embodiment is modified by stating that there is a spring utilized in conjunction with the hook that exerts a continuous bias tending to extract the hook member from the detent.

A further embodiment of the present invention is where the first basic embodiment is modified by the outer leg of the hook being defined as being shorter in length than the inner leg with there being defined a gap area between the outer leg and the base through which is to be inserted articles that are to be hung.

A second basic embodiment of the present invention defines a retractable purse hanger mounted in conjunction with a coin tray of a slot machine. The purse hanger has a base member which has a recessed chamber and within the recessed chamber is mounted a pivotally mounted hook which is movable between a retracted position and an extended position. With the hook in the extended position it is then to be used to hang articles thereon.

A further embodiment of the present invention is where the second basic embodiment is modified by defining that there is utilized a spring in conjunction with the spring which exerts a continuous bias tending to locate the hook in the retracted position.

A further embodiment of the present invention is where the second basic embodiment is modified by defining that the base member includes a detent with the hook to engage with the detent when in the extended position with the detent functioning to retain the position of the hook in this extended position.

A further embodiment of the present invention is where the second basic embodiment is modified by defining that the hook has an inner leg and an outer leg which are connected by a connecting leg. The inner leg includes structure to achieve the pivotally mounting of the hook relative to the base member. The outer leg is free and being generally parallel to the inner leg.

A further embodiment of the present invention is where the just previous embodiment is modified by defining that the outer leg is shorter in length than the inner leg with there being a gap located between the outer leg and the base member.

A further embodiment of the present invention is where a previous embodiment is modified by defining that the spring comprises a coil spring.

A further embodiment of the present invention is where a previous embodiment is modified by defining that there is included a finger recess on the connecting leg of the hook with this finger recess to facilitate manual movement of the hook from the retracted position to the extended position.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
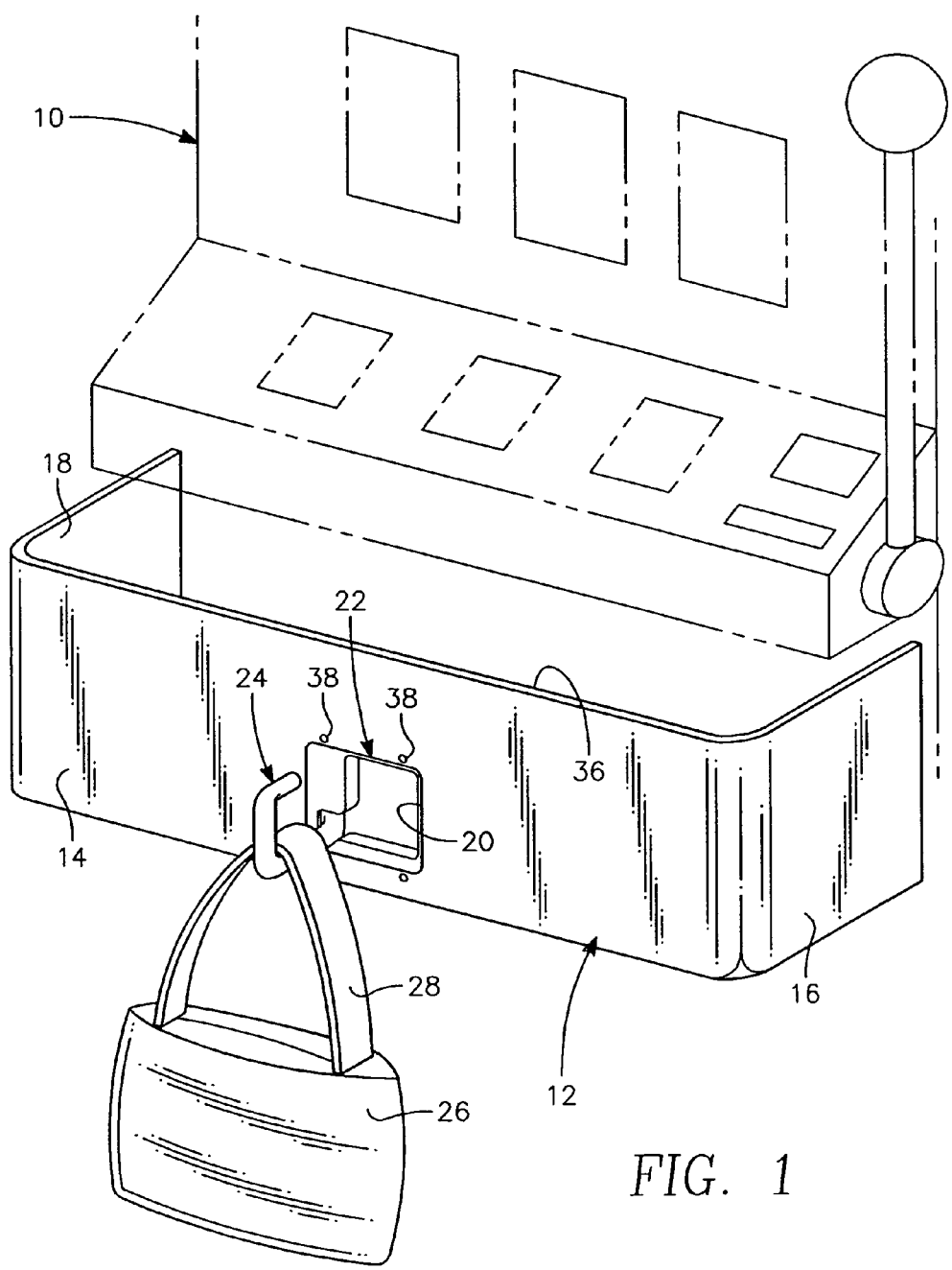
FIG. 1 is an isometric view of the retractable hanger of the present invention showing such mounted in conjunction with a coin tray of a conventional slot machine.

Referring particularly to the drawings, there is shown in FIG. 1 a conventional slot machine 10 in dotted lines. The lower frontal portion of the slot machine 10 includes a coin tray 12. The coin tray 12 includes a front wall 14 which is basically planar, but may be curved, which extends between a pair of sidewalls 16 and 18. There is to be formed within the front wall 14 a rectangularly shaped hole 20. Mounted within the hole 20 is the retractable hanger 22 of the present invention. The retractable hanger 22 includes a hook 24. The hook 24 is to be utilized to suspendingly hang an exterior structure, such as a purse 26. The strap 28 of the purse 26 is to be directly connected in conjunction with the hook 24, as is clearly shown in FIG. 1.

The retractable hanger 22 includes a base member 30. The base member 30 has a peripheral flange 32. The peripheral flange 32 includes a series of holes 34. The holes 34 are to facilitate connection with some type of a fastener, such as a rivet, screw, or the like, that is to be used to secure the base member 30 onto the front wall 14 of the coin tray 12. The coin tray 12 includes a coin receiving compartment 36. The peripheral flange 32 is to be located within the coin receiving compartment 36 with the fasteners that pass through the holes 34 also being conducted through holes 38 mounted within the front wall 14. There is shown four in number of the holes 34 and four in number of the holes 38 with it being understood that a given hole 34 is to align with a hole 38. It is considered to be within the scope of this invention that the number of the holes 34 and 38 can be increased or decreased without departing from the scope of this invention.

Located forward of the peripheral flange 32 and formed part of the base 30 is a continuous ledge 40. The thickness of the front wall 14 is to be located within the confines of the ledge 40. The result is the retractable hanger 22 of this invention is mounted in a completely recessed condition within the coin tray 12.

The base member 30 includes a recessed chamber 42. Mounted within that recessed chamber 42 is a hook 24. The hook 24 includes an outer leg 46 which is attached to a connecting leg 48 which in turn is integrally connected to an inner leg 50. The inner leg 50 includes a right angled extension 52. The right angled extension 52 is located substantially parallel to the connecting leg 48. The outer leg 46 is located substantially parallel to the inner leg 50. The entire hook 24 is constructed of round bar stock that may be solid or tubular and will normally be constructed either of plastic or metal. Also, the base member 30 can be constructed of either plastic or metal. The basic shape of the hook 24 is that almost of a totally enclosed, rectangularly shaped, ring with the exception of a gap 54 which is located between the end of the outer leg and the base member 30. It is through the gap 54 that the strap 28 is to be inserted in order to rest on the inner leg 50.

Figure 2:
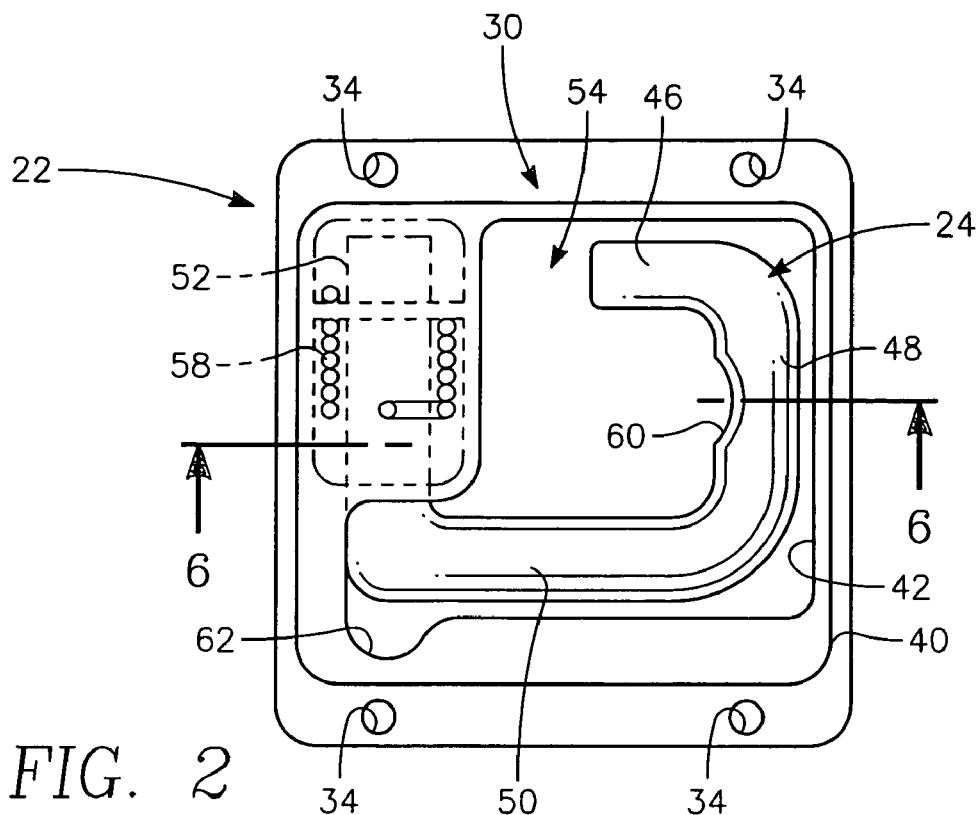
FIG. 2 is a front view of the retractable hanger of the present invention showing the hook in the retracted position and also depicting the coil spring, which will normally be hidden from view, mounted in conjunction with the hook.
Figure 3:
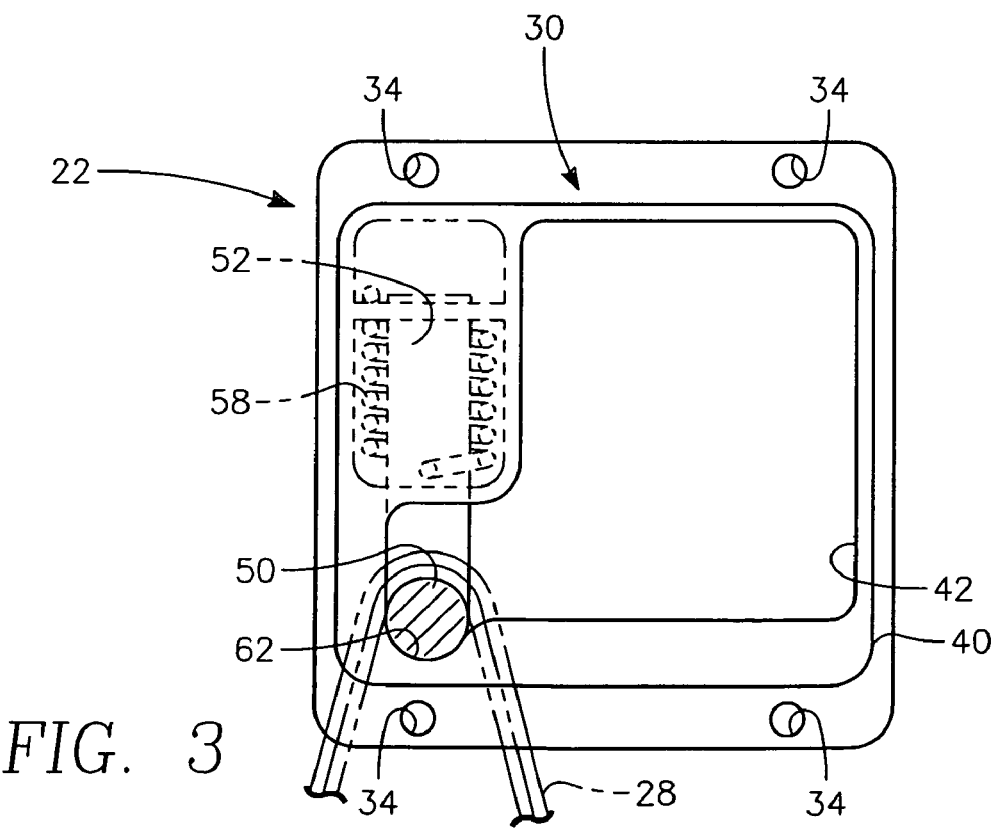
FIG. 3 is a view similar to FIG. 2 but partly in cross-section showing the hook in the extended position.
Figure 4:
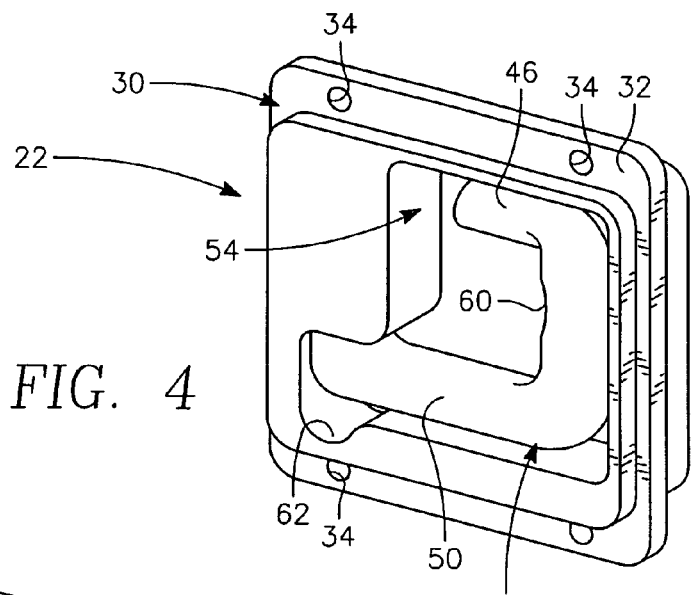
FIG. 4 is a frontal perspective view of the retractable hanger of the present invention showing the hook in the retracted position.
Figure 5:
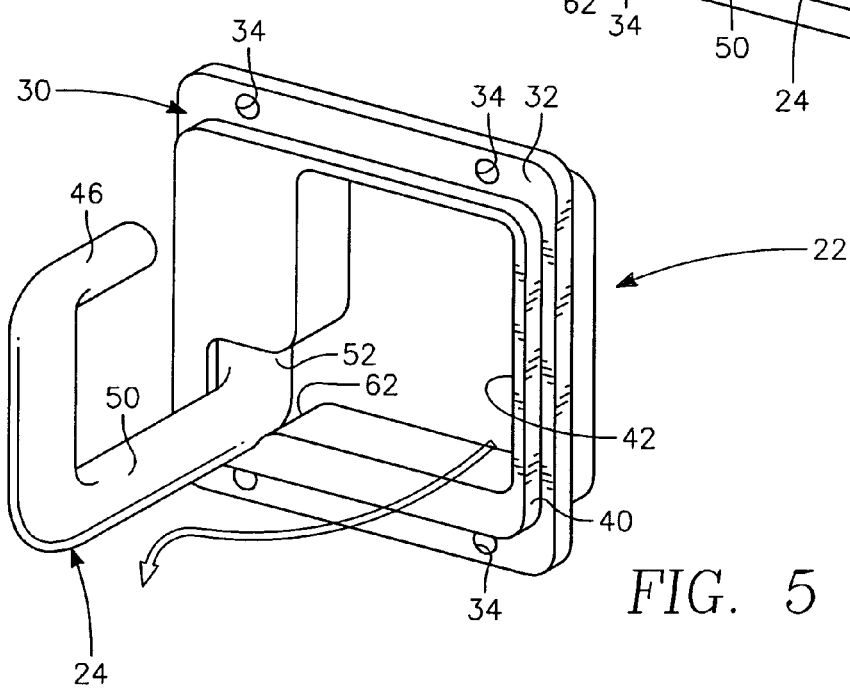
FIG. 5 is a view similar to FIG. 4 but showing the hook in the extended position.
Figure 6:
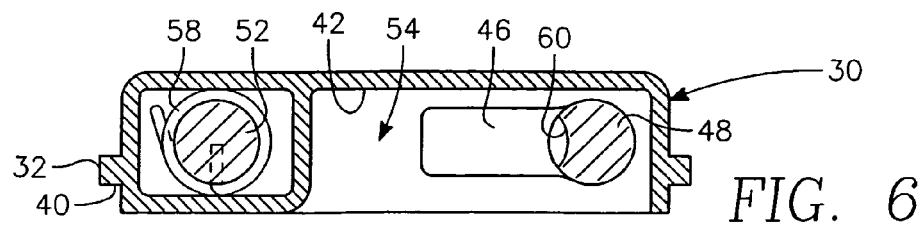
FIG. 6 is a transverse cross-sectional view of the retractable hanger of the present invention taken along line 6-6 of FIG. 2.

Surrounding the right angled extension 52 is a coil spring 58. One end of the coil spring 58 is securely attached to the right angled extension 52 and with the other end of the coil spring 58 being securely attached to the base member 30. The coil spring 58 exerts a continuous bias on the hook 24 tending to locate the hook 24 in the retracted position, which is shown in FIGS. 2 and 4 of the drawings. Physical manual movement of the hook 24 by having a person locating his or her finger within finger recess 60 which is formed on the connecting leg 48 will facilitate the pivoting of the hook 24 about ninety degrees to the extended position. When the user then places the strap 28 through the gap 54 with the strap resting on the inner leg 50, the weight of the purse will be such that the hook 24 will lineally move a short distance so that the inner leg 50 will connect with a recess defined as a detent 62. The function of the detent will be to retain the hook 24 in the extended position when hook 24 is being used to suspend the purse 26 and the hook 24 will not inadvertently have a tendency to move toward the retracted position. When the hook 24 suspends the purse 26, the weight of the purse 26 has caused the coil spring 58 to expand, which is clearly shown in FIG. 3 of the drawings. When the purse 26 and the strap 28 are removed from the hook 24, the hook 24 will then be automatically raised to disengage from the detent 62 by the bias of the spring 58 and the bias of the spring 58 will cause the hook 24 to pivot to the retracted position which is being located within the confines of the recess chamber 42.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A retractable hanger assembly comprising:
   a base member adapted to be securely mounted on an exterior structure with said base member being recessed within the exterior structure, said base member having a recessed chamber;
   a hook having an inner leg and an outer leg connected together by a connecting leg, said inner leg being pivotally mounted on said base member to be movable between a retracted position and an extended position, said retracted position locates said hook within said recessed chamber, said extended position locates said hook protruding from said base member, whereby said hook is to be manually moved to said extended position to then be used to hang articles thereon, and
   said inner leg having a right angled extension which is located substantially parallel to said connecting leg, a spring mounted on said right angle extension, said spring exerting a continuous bias on said hook tending to maintain said hook in said retracted position.

2. The retractable hanger as defined in claim 1 wherein: said outer leg being substantially parallel to said inner leg.

3. The retractable hanger as defined in claim 1 wherein: said connecting leg having a finger recess formed thereon, said finger recess adapted to be contacted by a human finger facilitating manual movement of said hook from said retracted position to said extended position.

4. The retractable hanger as defined in claim 1 wherein: said base member including a detent, said inner leg to connect with said detent when in said extended position, said detent functioning to retain said hook in said extended position.

5. The retractable hanger as defined in claim 4 wherein: a spring connecting with said hook, said spring exerting a constant bias on said hook tending to disengage said hook from said detent.

6. The retractable hanger as defined in claim 1 wherein: said outer leg being shorter in length than said inner leg forming a gap area between said outer leg and said base member which permits entry of an article to be hung on said hook.

7. The retractable hanger as defined in claim 1 wherein: said inner leg including a right angled extension which is pivotally mounted to said base member, said outer leg being free and generally parallel to said inner leg.

8. The retractable hanger as defined in claim 7 wherein: said outer leg being shorter in length than said inner leg forming a gap between said outer leg and said base member which is to permit access there through of an article that is to be hangingly supported by said hook.

9. The retractable hanger as defined in claim 7 wherein: a finger recess mounted on said connecting leg, said finger recess facilitating connection with a human finger to facilitate movement of said hook from said retracted position to said extended position.

* * * * *